(12) United States Patent
Lisiak et al.

(10) Patent No.: US 12,460,978 B2
(45) Date of Patent: Nov. 4, 2025

(54) FORCE TRANSDUCER WITH PRINTED CIRCUIT BOARD

(71) Applicant: FUTEK Advanced Sensor Technology, Irvine, CA (US)

(72) Inventors: Maciej Lisiak, San Clemente, CA (US); Farshid Allahakbari, Lake Forest, CA (US); Martin Illes, Santa Ana, CA (US)

( * ) Notice: Subject to any disclaimer, the term of this patent is extended or adjusted under 35 U.S.C. 154(b) by 522 days.

(21) Appl. No.: 17/940,474

(22) Filed: Sep. 8, 2022

(65) Prior Publication Data
US 2023/0074166 A1  Mar. 9, 2023

Related U.S. Application Data

(60) Provisional application No. 63/241,707, filed on Sep. 8, 2021.

(51) Int. Cl.
*G01L 1/22* (2006.01)

(52) U.S. Cl.
CPC .................. *G01L 1/2262* (2013.01)

(58) Field of Classification Search
CPC ........................ G01L 1/2262; G01L 1/2243
See application file for complete search history.

(56) References Cited

U.S. PATENT DOCUMENTS

| | | | | |
|---|---|---|---|---|
| 3,261,204 A * | 7/1966 | Jacobson | ............... | G01L 1/2225 73/862.52 |
| 3,315,203 A * | 4/1967 | Jacobson | ............... | G01L 1/2218 73/862.622 |
| 3,969,935 A * | 7/1976 | Shoberg | ................ | G01L 1/2218 73/862.635 |
| 4,064,744 A * | 12/1977 | Kistler | ..................... | G01B 7/18 73/849 |
| 4,478,089 A * | 10/1984 | Aviles | ..................... | G01L 5/226 901/46 |
| 5,109,175 A * | 4/1992 | Albert | ................... | G01P 15/097 310/329 |
| 5,220,971 A * | 6/1993 | Farr | ....................... | G01L 1/2262 177/229 |
| 5,336,854 A * | 8/1994 | Johnson | ............... | G01G 3/1412 177/229 |
| 5,591,943 A * | 1/1997 | Cheng | ....................... | B66C 1/40 177/229 |
| 5,929,390 A * | 7/1999 | Naito | .................... | G01G 3/1412 177/229 |
| 6,298,733 B1 * | 10/2001 | Kimerer, Jr. | ............. | G01B 7/16 73/812 |

(Continued)

*Primary Examiner* — Freddie Kirkland, III
(74) *Attorney, Agent, or Firm* — Young Basile Hanlon & MacFarlane, P.C.

(57) ABSTRACT

A force transducer capable of measuring tension and/or compression loads, including a generally rectangular flexure body made of high modules of elasticity material having through cuts that divide the body into an S shaped force transmission path. Strain gages are strategically located on the inside surfaces of a central opening and are connected into a bridge circuit mounted on a printed circuit board which is integrally attached to said body. Printed circuit means are provided for conditioning and transmitting signals from the bridge circuit either through hardwiring or wirelessly. A battery powered embodiment is described. Various configurations of covers for the device are shown.

14 Claims, 8 Drawing Sheets

(56) References Cited

U.S. PATENT DOCUMENTS

| | | | | |
|---|---|---|---|---|
| 6,794,587 | B2* | 9/2004 | Aumard | G01G 3/1412 |
| | | | | 177/229 |
| 9,709,436 | B2* | 7/2017 | Johnson | G01G 3/14 |
| 11,022,506 | B2* | 6/2021 | Wang | G01G 3/1412 |
| 11,079,292 | B2* | 8/2021 | Lisiak | G01L 1/2287 |
| 11,639,879 | B2* | 5/2023 | Lisiak | G01L 5/101 |
| | | | | 73/862.474 |
| 2020/0022739 | A1* | 1/2020 | Benson | A61B 5/1495 |
| 2020/0041365 | A1* | 2/2020 | Johnson | G01L 1/2243 |
| 2020/0141823 | A1* | 5/2020 | Wang | G01L 1/2243 |
| 2021/0108976 | A1* | 4/2021 | Lisiak | B66C 1/12 |

\* cited by examiner

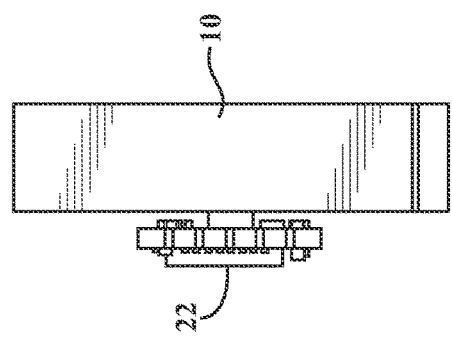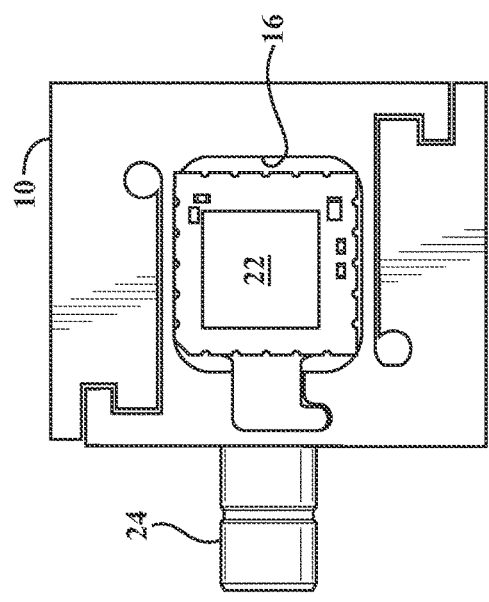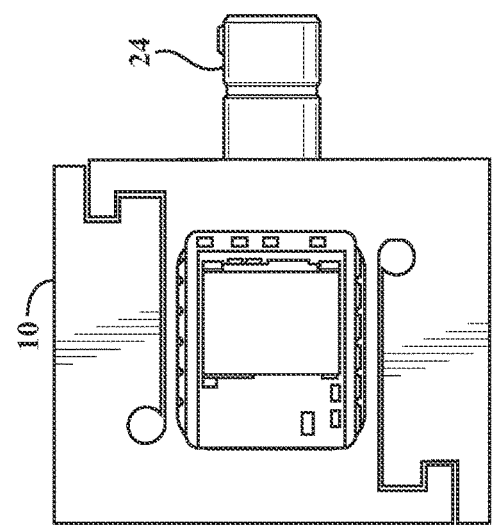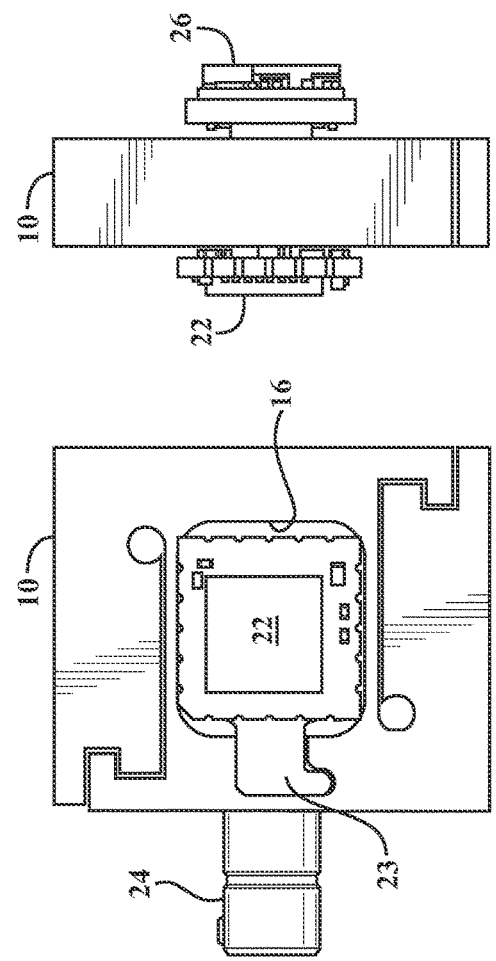
FIG. 2A  FIG. 2B
FIG. 3A  FIG. 3B  FIG. 3C

FORCE TRANSDUCER WITH PRINTED CIRCUIT BOARD

CROSS-REFERENCE TO RELATED APPLICATION

This application claims priority to Provisional Application Ser. No. 63/241,707 filed Sep. 8, 2021, the entire content of which is incorporated herein by reference.

FIELD OF THE INVENTION

The device described in this document is in the field of force transducers, also known as load cells, of the type comprising a flexure body instrumented with stain gages to produce electrical signals representing forces such as tension and/or compression and/or torque.

BACKGROUND

Force transducers including load cells and torque sensing generally comprise a flexure body of a high modulus of elasticity material such as aluminum, stainless steel or Inconel instrumented with strain gages which are connected into a bridge circuit. Resistance changes caused by strain in the areas covered by the gages unbalance the bridge and produce electrical signals which are connected to an outside device to monitor various loads for various purposes.

SUMMARY OF THE DISCLOSURE

The device described herein is a load cell comprising a flexure body 10 which may take any of various shapes but preferably exhibits opposite parallel plane faces A and B peripheral edges. The flexure body further comprises an opening 16 extending to and through the opposite faces thereof. Strain gages or the like are mounted on portions of the interior surface of the opening to respond to elastic distortion of the flexure body to produce resistance changes. When the strain gages are connected into a bridge circuit those changes in resistances result in output voltages which vary in accordance with the applied load, be it tension, compression or torque.

In accordance with the present disclosure, the bridge circuit is mounted on a printed circuit board (PCB) that is physically separate from the flexure body but mounted to and adjacent the flexure body in parallel relation to an outside plane surface of the flexure. The mounting of the PCB may be accomplished by means of an appendage that fits into a slot formed in the outside plane surface and extending into the central opening. In the illustrative embodiment, the flexure body is generally rectangular in shape and the opening 16 which provides the interior surfaces for strain gage mounting positions is centrally located and extends, as explained above, between opposite plane surfaces of the flexure body. The body is machined by one of any available processes to flex in a desired fashion in response to applied loads, in this case the machining takes the form of narrow through cuts 12 and 14 extending from opposite side surfaces above and below the central opening to provide an S-beam transducer.

In one illustrative embodiment a single printed circuit board is provided lying outside the central opening 16 and generally parallel to one of the two outside plane surfaces but having, as described above, a mounting structure which fits into a strategically shaped slot in the flexure body to provide a structural mount that holds the printed circuit board in place. In another embodiment there are two printed circuit boards, mounted one on each side of the flexure body and structurally mounted to it as explained above. The PCBs carry circuits that perform different functions; i.e., the bridge circuit may be mounted on one PCB while a signal conditioning circuit and/or a wireless signal transmitter circuit may be mounted on the other PCB.

As further described herein, a cover is mounted to the flexure body and has a curved part overlying and providing volume to enclose a PCB for protection purposes. The cover may be variously shaped to have edge portions that contact the PCB surface while the volume between the edge surfaces is raised to provide space or volume for the circuitry on the PCB. The cover may have a generally flat surfaced portion opposite and parallel to the domed portion to lie in contact with the opposite surface of the flexure body for support and stability.

In another embodiment using PCBs on both sides of the flexure, the cover has two domed or clamshell portions, each overlying a respective plane surface of the flexure as well as the PCB on that surface. Where a cover portion is shaped to provide an interior volume, it has a clam shell shape, and is generally not adhered to the plane surface.

In the illustrative embodiment, the cuts 12 and 14 through the flexure body that lie above and below the central opening 16 are reversely similar to one another and enter the flexure body from opposite side surfaces to provide the S-beam configuration as described above. The cuts 12 and 14 may be straight or configured in a unique and proprietary block S fashion as shown.

BRIEF DESCRIPTION OF THE DRAWINGS

FIGS. 2A and 2B show a digital embodiment from front and side;

FIGS. 3A to 3C show a cable powered wireless signal transmitting embodiment;

DETAILED DESCRIPTION OF THE ILLUSTRATIVE EMBODIMENTS

Figure 1A:
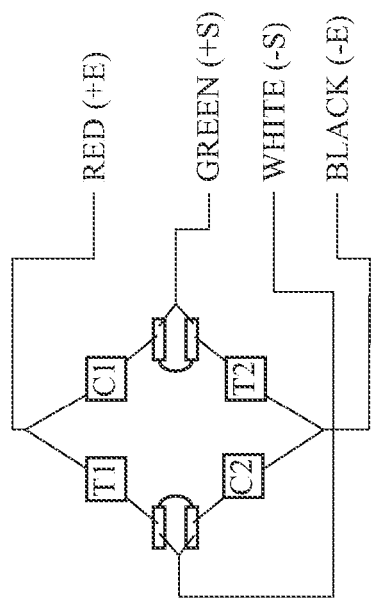
FIG. 1A is a plan view of a bridge circuit formed on the PCB using strain gages mounted on the flexure body.
Figure 1:
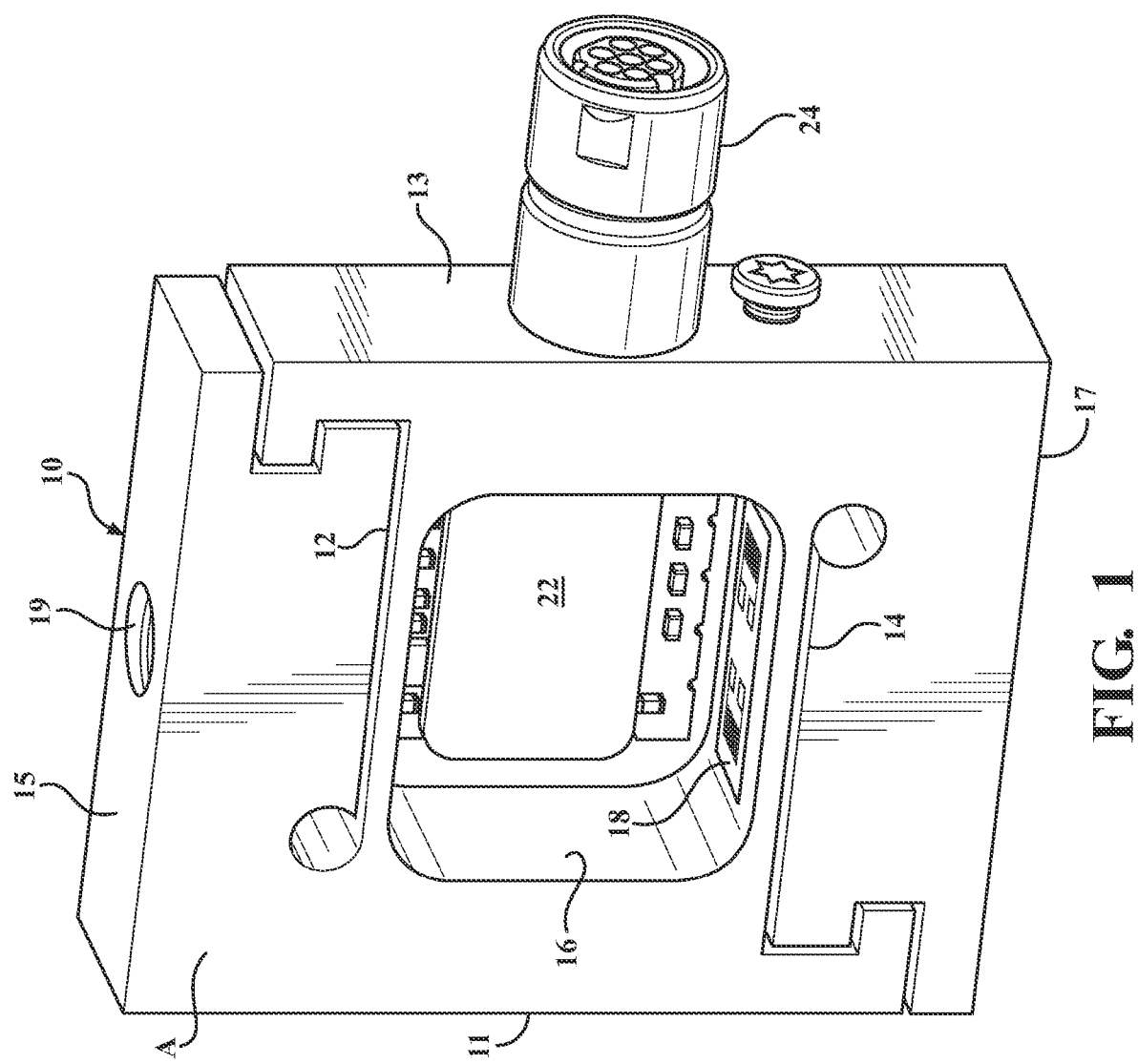
FIG. 1 is a perspective view of the flexure body forming the main part of the transducer without a cover and showing the printed circuit board (PCB) that carries a bridge circuit.

Referring to FIGS. 1, 1A, 2A and 2B, the illustrated embodiment comprises a generally rectangular flexure body 10 of high modulus of elasticity such as aluminum, stainless steel or Inconel with parallel and generally flat major outside surfaces A and B, side edge surfaces 11 and 13, and flat top and bottom edges surfaces 15 and 17. A central opening 16 extends fully through the body between the parallel outside surfaces A and B and is generally rectangular in shape with rounded corners. The opening provides a continuous 360 degree interior surface on which the upper and lower parallel portions thereof define strain concentration areas and are instrumented with strategically located strain gages 18 which are connected into a bridge circuit as shown in FIG. 1A. The strain gages 18 are mounted on insulative pads 18 and 20 which are adhered to the lower and upper inside surfaces of the opening 16 and the strain gages are labeled in FIG. 1A T1, T2, C1 and C2, the letter T standing for tension responsive devices while the letter C standing for strain gages responsive to compression loads. Adjacent each strain gage is a solder pad for making electrical connections that create the bridge circuit as shown in FIG. 1A.

The wiring connections that form the bridge circuit extend to and are mounted on a printed circuit board (PCB) 22, which "floats"; i.e. is located just outside of the opening 16 out of contact with the flexure body except as explained below. The PCB 22 is generally flat and lies parallel to the closest adjacent outside surface B. In addition, the PCB 22 is generally of a size no greater than the surface B of the flexure body and, in this case, corresponds approximately to the area of the opening 16. To mount the PCB 22 and hold it in place, the PCB incorporates an L-shaped structural appendage 23 which projects from one edge and extends into and is held in place by a slot opening formed in one plane surface of the flexure body. The slot is shaped to snugly receive the appendage 23 so that it can simply be pushed into place through the face of the flexure body and held by friction and/or adhesive where such additional support is deemed necessary.

As further explained herein, dc power can be connected to the bridge circuit on the PCB and signals can be taken from the bridge circuit directly by conductors extending through a connector 24 which extends through the flexure body to extend out from the side surface 13 of the flexure body 10. Alternatively, signals from the bridge can be transmitted wirelessly by way of means of a transmitter circuit provided on a second circuit board as described in greater detail below. As also described herein, the connector 24 can be used to mount a PCB cover device as shown in the various drawing figures. The transmitter may use any of various known coding systems depending on power level and security needs.

Figure 4C:
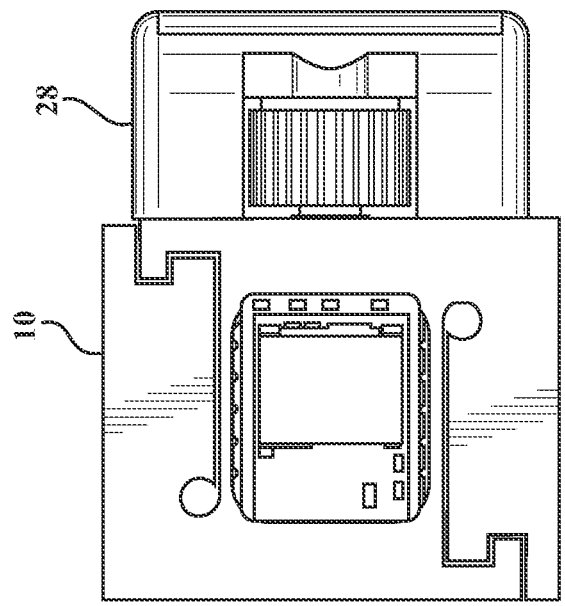
FIGS. 4A to 4C make up a series of views of an embodiment with a removable battery module for powering the circuitry of the sensor.
Figure 4B:
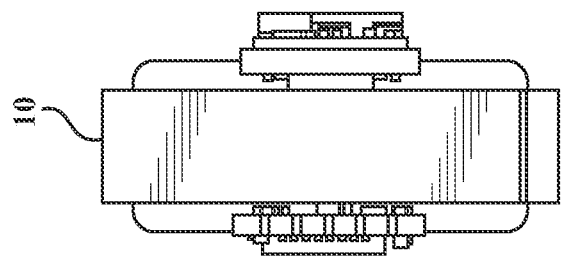
Figure 4A:
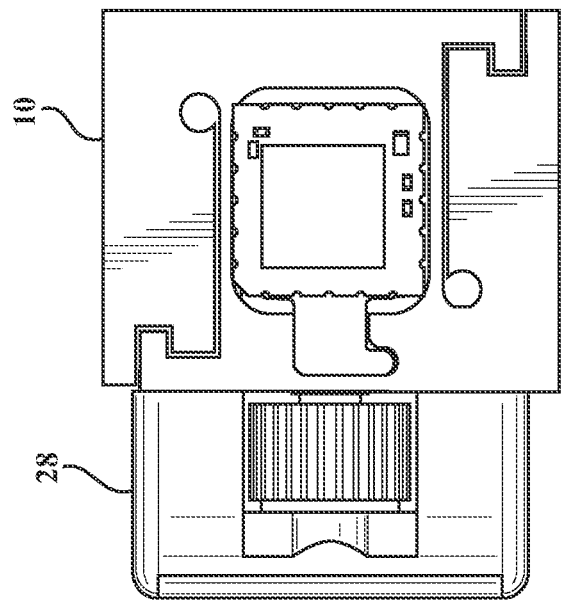
Figure 5:
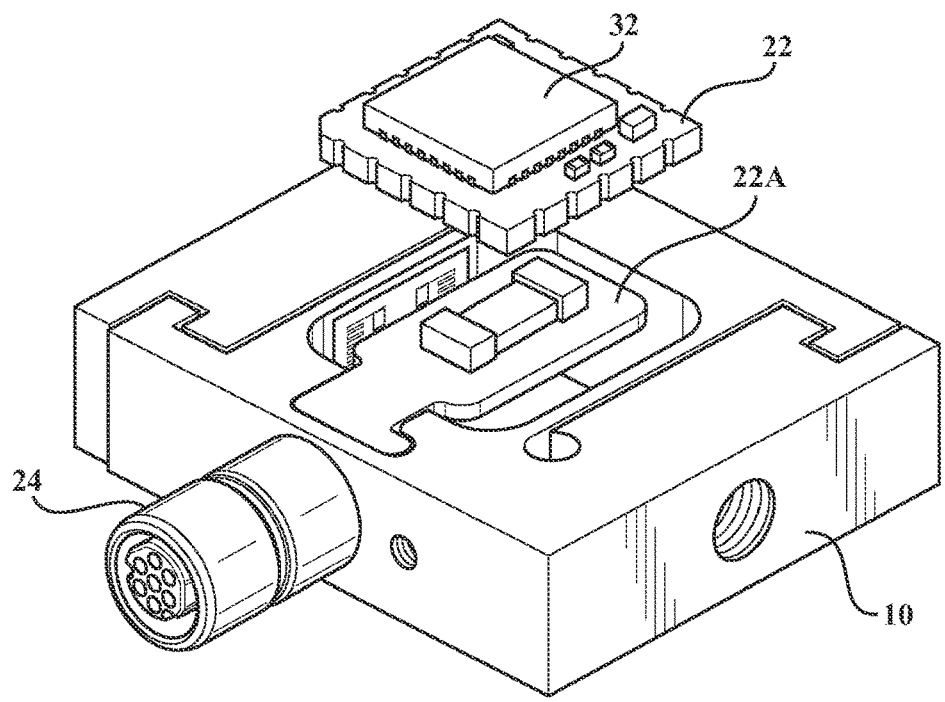
FIG. 5 is a perspective view of an embodiment with an "embedded" PCB and a floating bridge PCB.

FIGS. 2A, 2B and 5 show the embodiment with a single PCB 22 while FIGS. 3A-3C and 4A-4C respectively show embodiments with a PCB mounted adjacent and parallel to each face of the flexure body 10. In FIGS. 3A-3C power is supplied by cable through connector 24 while the output signals are generated by a signal conditioning module 26 on a second PCB 26 just outside of and parallel to the opposite face of the body 19. In FIGS. 4A-4C a battery module 28 provides power to the circuits carried on the PCBs on both sides of the flexure body. The signal conditioning module 26 comprises amplifiers and smoothing circuits in a known manner to form dc signals from the bridge circuit into appropriate amplitude for cable conduction or excitation of a low range VHF transmitter.

Figure 6:
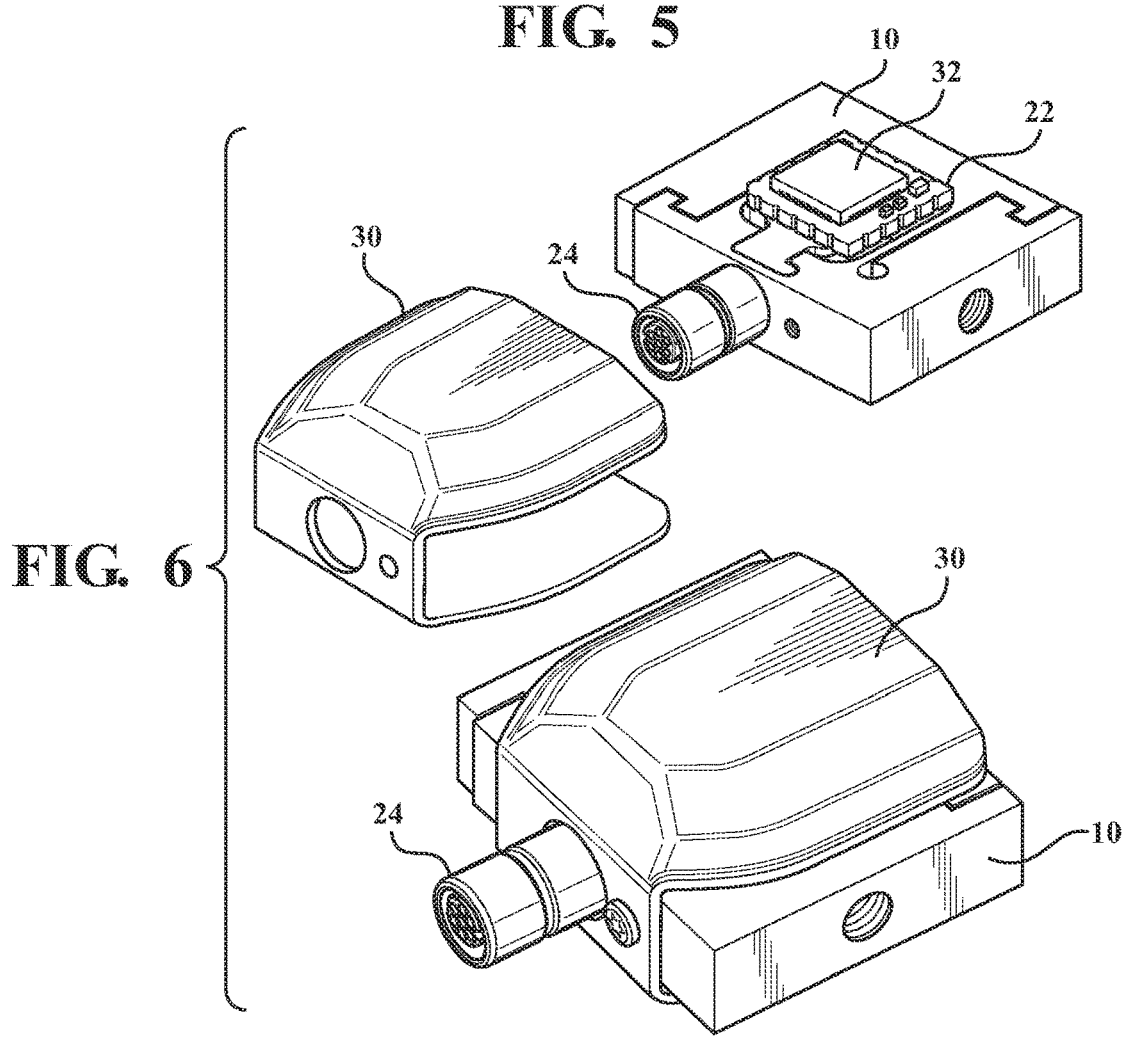
FIGS. 6 and 13 show an embodiment with a cover for a PCB.

FIGS. 5 and 6 show a modified version of the digital cable powered embodiment in which the PCB 22A is provided in low-profile form, is mounted wholly within the opening 16 and is electrically interconnected with the PCB 22 and a floating digital signal conditioning module 32 that is "piggy-back" mounted on the PCB 22. The low-profile PCB 22A is, as in the embodiment of FIG. 1, embedded into the flexure body 10 for structural attachment and lies within the enclosed volume of the central aperture 16. The digital signal conditioning module 32 and the PCB 22 on which it is mounted lie outside of the volume of the central aperture and are parallel to the outside face of the flexure body 10 as was described with reference to FIG. 1.

FIGS. 3A, 3B and 3C and FIGS. 6 and 7 show in multiple parts how a PCB cover 30 can be attached to the flexure body. The cover carries no circuitry but is a protective device for the PCBs and can be made of various materials including plastic, composite and metal and is shaped to provide interior volume on at least one of the two parallel sides. Cover 30 has a hole in the section that integrally joins the two sides and uses that hole to fit onto the connector 24 that extends from the side of the flexure body. The low-profile PCB of FIG. 5 is located within the volume provided by the cover 30.

In FIG. 6 the cover 30 is made of a composite, polymetric or metal material and provided on one side with a cover shape resembling a clam shell with an interior volume capable of enveloping and enclosing the circuit boards which are mounted directly to the flexure body or to the opposite PCB in parallel with outside faces A and B of the flexure body 10. A screw 43 can be used to secure the cover 30 to the flexure body 10 by way of a drilled and tapped hole.

Figure 7:
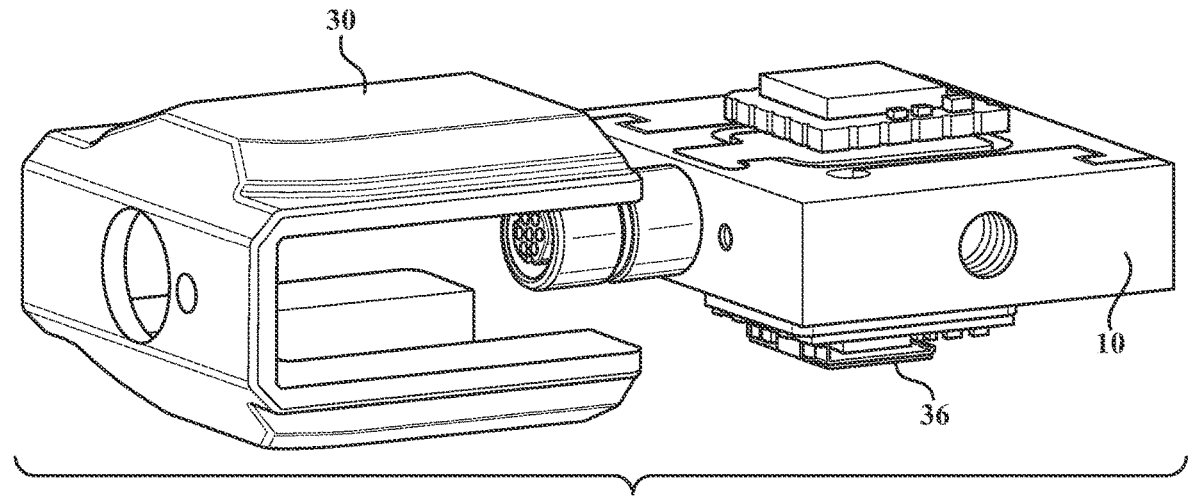
FIG. 7 shows another embodiment with a cover.
Figure 8:
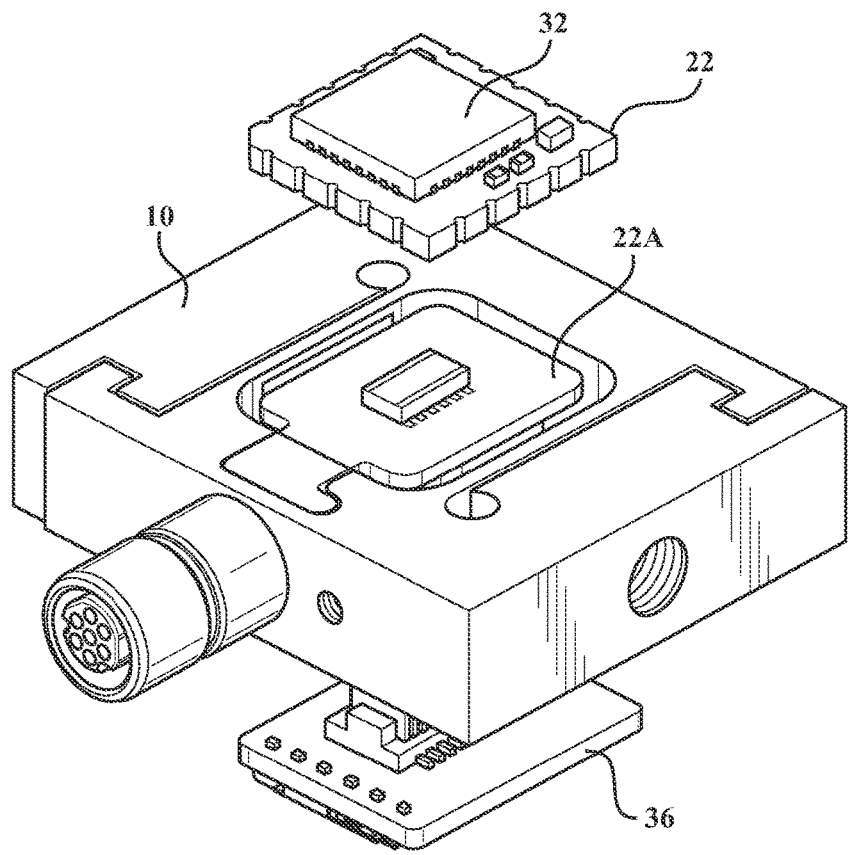
FIG. 8 is a perspective view of a cable powered, wireless signal transmission embodiment with imbedded and floating PCB's for specific purposes.
Figure 9:
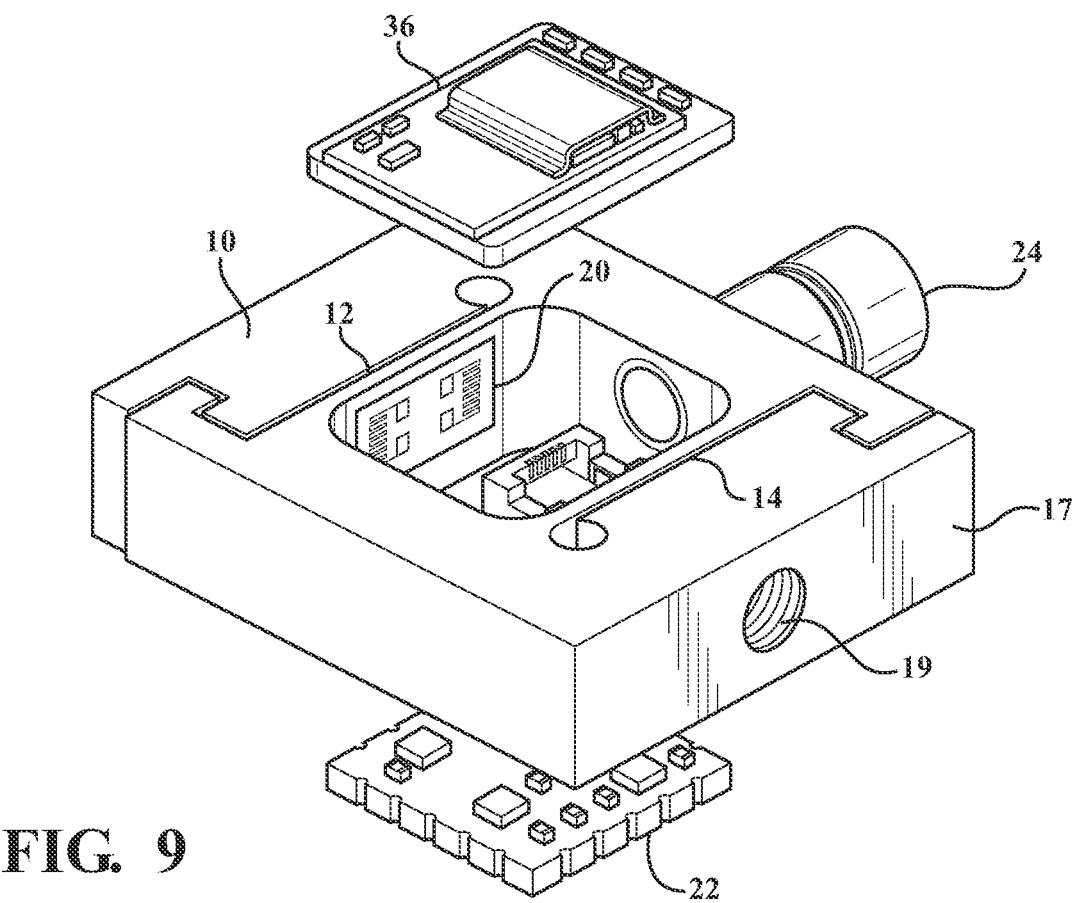
FIG. 9 is a reversed perspective view of the embodiment of FIG. 8.

Referring to FIG. 8 the wireless embodiment is shown again with a low-profile embedded PCB 22A and a floating digital signal conditioning module 32 on PCB 22 on the outside of the body. On the opposite side is a wireless transmitter module 36 which is also attached to receive signals from the bridge circuit and transmit them wirelessly to an external receiver. As also shown in FIG. 7 the clam shell type cover 30 is attachable to the flexure body 10 and the PCB by sliding over the connector 24 and being held in place by means of a screw 43 threaded into a tapped hole. FIG. 9 shows the backside of the embodiment of FIG. 8, with S-cuts 14 and 16.

Figure 10:
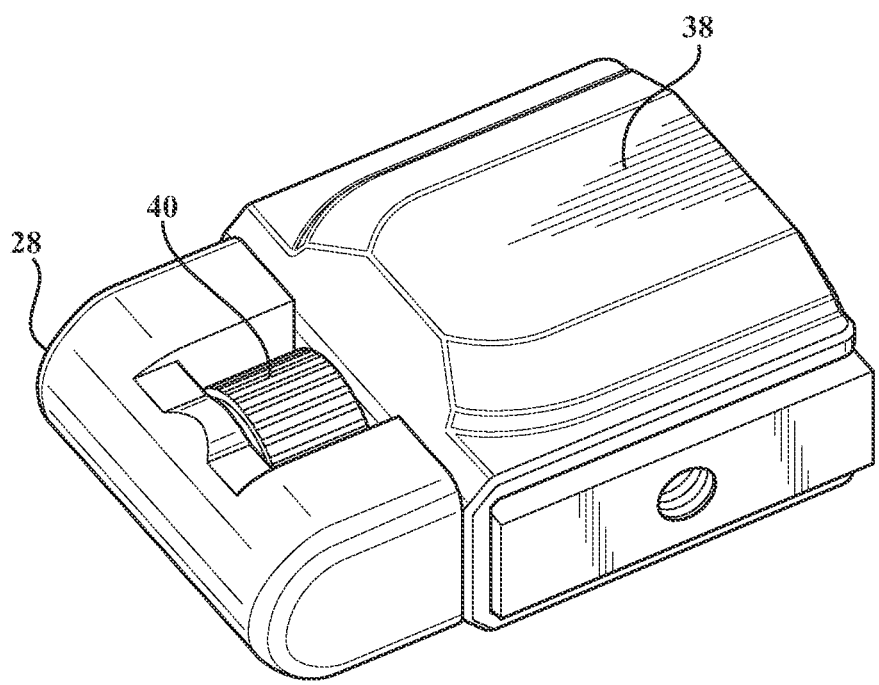
FIGS. 10-12 are perspective views of a battery powered embodiment with a special attachment. feature.
Figure 11:
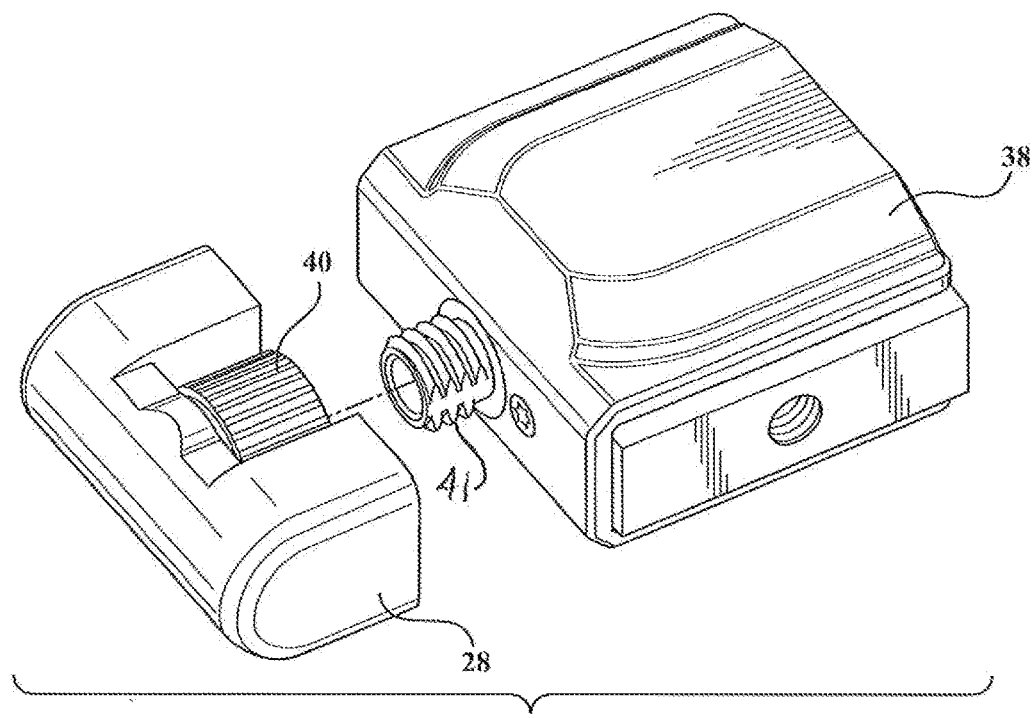
Figure 12:
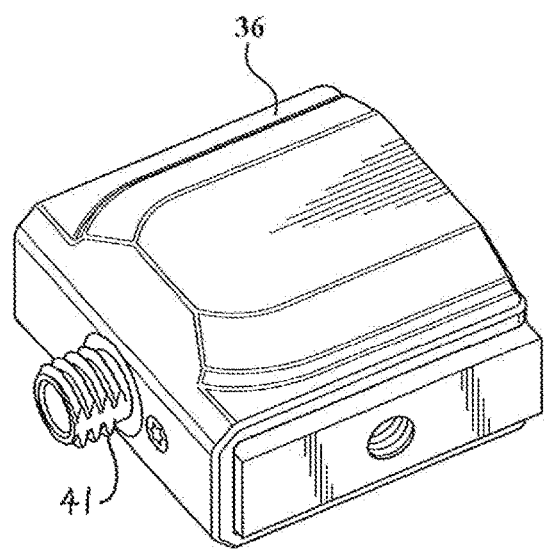
Figure 14:
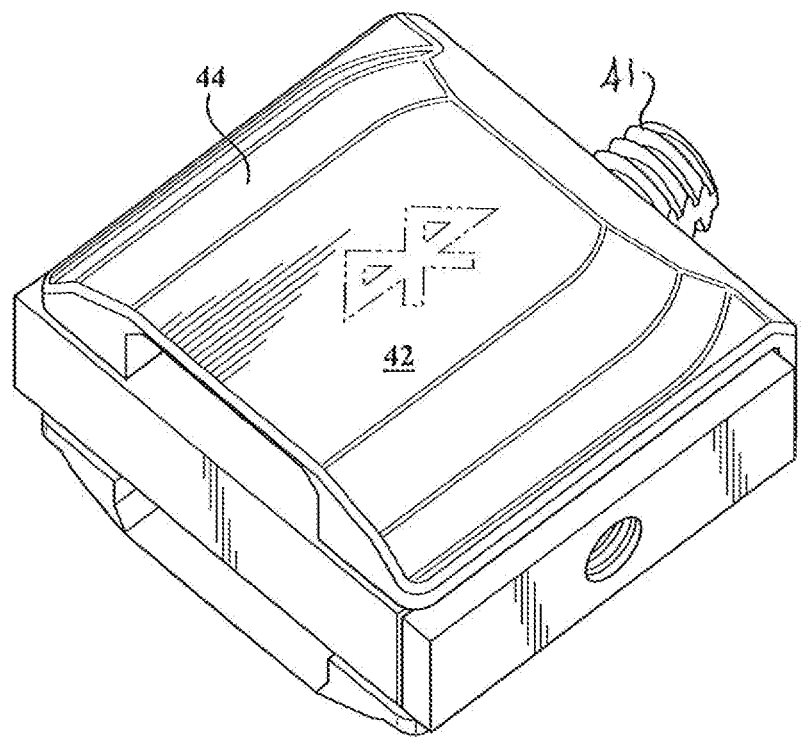
FIG. 14 shows an embodiment with a two-sided clamshell or "volumetric" cover.

Referring now to FIGS. 10 and 11 a wireless battery module 28 powered embodiment is illustrated. The battery module 28 is attached to a connector 41 which as shown in FIGS. 11, 12 and 14 is threaded to receive a rotatable nut 40 which is captured onto a stub shaft (not shown) on the battery module 28. While the threaded connection shown is preferred, a friction fitting can also be used to connect the battery module 28 to the connector 24. A clam shell cover 38 is attached first and held in place by means of a screw 43 and the battery module 28 is thereafter attached to connector 24A as shown.

As shown in various figures, the cover can be flat on one side if volume is not needed to cover a floating PCB. In this case the flat portion of the cover contacts the face of the flexure body 10 for support and stability. The covers are preferably not adhered to the flexure body so they may be easily removed. The cover surface may be engraved or labeled to show the identity of a manufacturer or sales organization. In all cases, the cover preferably slips over the flexure body by way of connector 24 as described above but can be attached via the opposite side of the flexure by one or more screws.

Figure 15:
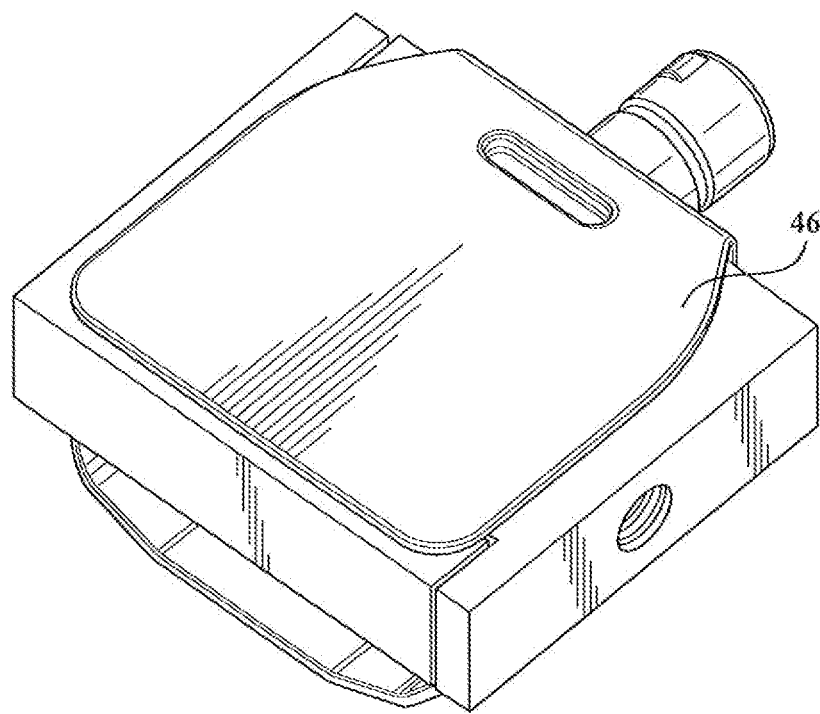
FIG. 15 shows an embodiment with a cover having a flat configuration on one side that allows it to lie against one side of the flexure body.

FIG. 15 shows a cover embodiment 44 with a clam shell cover portion on one side and a flat "bikini" portion 46 on the other side that rests directly against the faces of the flexure body 10 to provide support as explained above.

Figure 13:
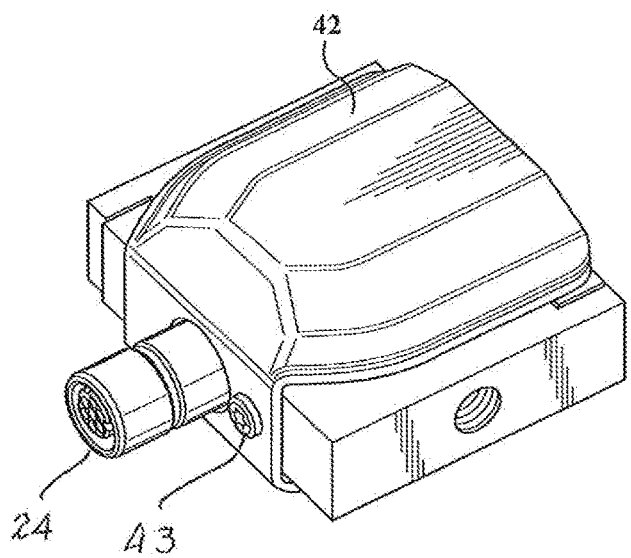

FIGS. 13 and 14 show additional covers with slightly different designs. FIG. 14 is a cover of composite material and is of full volumetric configuration in that it does not incorporate the flat bikini configuration shown in FIG. 15. The cover with the bikini portion 46 is preferably made of aluminum.

It will be seen that the unique configuration of the S Beam body 10 allows for miniaturization for use in smaller, more confined circumstances and application as may, for example, be found in surgical and spacecraft applications.

The height of the flexure body in a representative embodiment is 20 mm and the drawings are to scale.

It will be understood that the invention has been described with references multiple embodiments and multiple configuration all of which are illustrative in nature and with the understanding various additional modifications and additions may be to the embodiment as described.

What is claimed:

1. A flexure body made of a high modulus of elasticity material having first and second opposite parallel outside surfaces and a central opening extending between said surfaces, strain sensing means mounted to the flexure body within said center opening;
   at least one printed circuit board carrying bridge circuitry for processing signals from said strain gages on the flexure body, said printed circuit board being mounted to and in parallel with an outside surface of said flexure body; and
   a connector structure extending through an outside edge surface of the flexure body for making electrical connections to the printed circuit board, a cover attached to said flexure body and extending over said printed circuit board, wherein the cover is contoured to provide an interior volume to accommodate said printed circuit board and has two concaved clam shell portions, each on and extending over a respective outside surface of said flexure body;
   said flexure body further comprising a second printed circuit board having circuit means mounted there on laying parallel to an outside plane surface of said flexure body opposite to the first printed circuit board and within one of the two clam shell portions of said cover.

2. The flexure body as described in claim 1 wherein the printed circuit boards are substantially planar in configuration.

3. The flexure body as described in claim 2 further comprising a battery module mounted to the flexure body by way of said connector.

4. The flexure body as described in claim 3 wherein the connector is threaded to receive said battery module.

5. The flexure body as defined in claim 1 wherein the cover is made of plastic.

6. The flexure body as described in claim 5 wherein the cover is in partial contact with an outside surface of the flexure body.

7. The flexure body as described in claim 1 wherein the flexure body has through cuts machined into and through said outside plane surfaces to provide an S-beam configuration responsive to tension and/or compression loads to produce electrical signals by way of said strain gages and bridge circuitry.

8. An S-beam transducer for measuring tension and/or compression loads comprising:
   a flexure body made of a high modulus of elasticity material having opposite parallel outside surfaces, side edges and a substantially centrally located aperture extending between said parallel outside surfaces, said aperture forming a continuous inside surface having upper and lower portions;
   first and second oppositely directed cuts extending across and through said body between said faces, one of said cuts being located above the centrally located aperture and the other of said cuts being located below the centrally located aperture to define areas of stress concentration in said flexure body adjacent said inside surfaces;
   strain gages mounted on said areas of stress concentration;
   a printed circuit board physically attached to said flexure body but separate therefrom and mounted primarily outside of said central opening and parallel to one of said outside surfaces; and
   said printed circuit board carrying a bridge circuit connected to said strain gages.

9. An S-beam transducer as defined in claim 8 wherein in each of said through cuts has a block S-shape.

10. An S-beam transducer as defined in claim 8 further including a connector extending from an outside edge surface of said flexure body.

11. A transducer for measuring tension and/or compression loads comprising:
   a flexure body made of a high modulus of elasticity material having opposite parallel faces, side edges and a substantially centrally located aperture extending between said faces; said aperture forming upper and lower inside surfaces;
   first and second oppositely located S-shaped cuts extending across and through said body between said faces, one of said cuts being located above the centrally located aperture and the other of said cuts being located below the centrally located aperture to define areas of stress concentration in said flexure body adjacent said inside surfaces;
   strain gages mounted on said areas of stress concentration;
   said strain gages being connected to form a bridge circuit that produces signals representing loads applied to said flexure body;
   a printed circuit board carrying said bridge circuit and being physically attached to said flexure body;
   said transducer further including a second printed circuit board mounted to the flexure body adjacent and parallel the opposite plane surface and carrying a wireless transmitting module for transmitting signals coming from said bridge circuit.

12. A transducer as defined in claim 11 wherein each of said cuts has a first portion that extends from aside edge into and partially laterally across the transducer body, a second portion that extends longitudinally toward the aperture, a third contiguous portion that extends back toward the edge surface of entry and a fourth portion that extends farther toward the central aperture and a final contiguous portion that extends across the transducer body and in close approximate to the central aperture.

13. A transducer as defined in claim 11 further including a battery module mounted to said flexure body.

14. A transducer as defined in claim 11 further including a two-sided cover attached to said flexure body and having parallel cover plates extending over the plane surfaces of said flexure body and said printed circuit boards.

* * * * *